United States Patent
Carleton et al.

(10) Patent No.: US 12,169,712 B2
(45) Date of Patent: Dec. 17, 2024

(54) SECRETS FRAMEWORK

(71) Applicant: Stripe, Inc., South San Francisco, CA (US)

(72) Inventors: Paul Alfred Carleton, London (GB); Andrew Joseph Dunham, Ottawa (CA); Serhii Rud, Dublin (IE); Adam Bradley Stubblefield, Belfair, WA (US); Caitriona Kelly, Dublin (IE)

(73) Assignee: Stripe, Inc., South San Francisco, CA (US)

( * ) Notice: Subject to any disclaimer, the term of this patent is extended or adjusted under 35 U.S.C. 154(b) by 292 days.

(21) Appl. No.: 17/750,043

(22) Filed: May 20, 2022

(65) Prior Publication Data
US 2023/0409315 A1 Dec. 21, 2023

(51) Int. Cl.
*G06F 8/71* (2018.01)
*G06F 8/40* (2018.01)

(52) U.S. Cl.
CPC . *G06F 8/71* (2013.01); *G06F 8/40* (2013.01)

(58) Field of Classification Search
CPC ..................................... G06F 8/40; G06F 8/71
See application file for complete search history.

(56) References Cited

U.S. PATENT DOCUMENTS

| | | | | |
|---|---|---|---|---|
| 8,422,674 | B2* | 4/2013 | Murase | G06F 21/52 |
| | | | | 380/255 |
| 2018/0137272 | A1* | 5/2018 | Kamal | G06F 8/71 |
| 2021/0304341 | A1* | 9/2021 | Green | G06F 16/435 |
| 2022/0261487 | A1* | 8/2022 | Lounsberry | G06F 21/6209 |

FOREIGN PATENT DOCUMENTS

EP 3660715 A1 * 6/2020 ............. G06F 21/52

* cited by examiner

*Primary Examiner* — Hanh Thi-Minh Bui
(74) *Attorney, Agent, or Firm* — Womble Bond Dickinson (US) LLP (57) ABSTRACT

Methods and apparatuses for using secrets and a secrets framework are described. In some embodiments, the method comprises executing, by a computing system, application code that includes a reference to a secret value inaccessible to the application code, the reference being in the form of a handle that contains the secret value, including passing the handle to injector code; and executing the injector code, including accepting the handle; obtaining the secret value from the handle; and using the secret value in an operation on behalf of the application code.

17 Claims, 7 Drawing Sheets

SECRETS FRAMEWORK

FIELD

Embodiments of the present disclosure relate to the field of software development and execution; more particularly, embodiments of the present disclosure relate to executing software in a manner that prevents secrets misuse.

BACKGROUND

Software development usually involves a number steps including determining requirements, drafting specifications, designing a software architecture, coding, testing, debugging, and deploying or otherwise releasing the software. In software product development, a software build environment may be used to create, test and debug a software project using tools as an interface to the software development process. One result of a software development process is the generation of executable and binary files derived from one or more source files containing source code. Thereafter, these executable and binary files may be released or deployed for use.

When software is being developed for use in certain environments (e.g., payment processing systems, etc.), some application code uses secrets to perform certain operations. For example, some application code generates external network requests that include passwords or other secret data in an authorization header to gain access to data or an infrastructure. Other examples of raw secret data may include cryptographic keys and other sensitive or critical customer data. In many instances, the ability to serve customers hinges on the ability to maintain their trust that the customer's business critical data is going to be protected. Part of this trust is based on the ability to maintain these secret values of a customer. This requires preventing any secret value of a customer from being misused or accidentally leaked, whether it be into logs, stack traces, error messages or in any other manner.

SUMMARY

Methods and apparatuses for using secrets and a secrets framework are described. In some embodiments, the method comprises executing, by a computing system, application code that includes a reference to a secret value inaccessible to the application code, the reference being in the form of a handle that contains the secret value, including passing the handle to injector code; and executing the injector code, including accepting the handle; obtaining the secret value from the handle; and using the secret value in an operation on behalf of the application code.

BRIEF DESCRIPTION OF THE DRAWINGS

The present disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

In the following description, numerous details are set forth to provide a more thorough explanation of the present disclosure. It will be apparent, however, to one skilled in the art, that the present disclosure may be practiced without these specific details. In other instances, well-known structures and devices are shown in block diagram form, rather than in detail, to avoid obscuring the present disclosure.

Techniques are disclosed herein for a secrets framework that prevents secret misuse and accidental exposure of a secret. In some embodiments, the raw secret values may comprise passwords, key, credentials, other access data, or other critical/important customer business data. The techniques describe herein make it difficult to unintentionally share a raw secret value. This is particularly useful in situations where developers are developing software (application code) that needs to utilize a raw secret value to perform a function or facilitate an operation. In this manner, the use of the secrets framework prevents access to the raw secret value by the developer, thereby enhancing security with respect to the raw secret value.

In some embodiments, the secrets framework uses a "secrets bag", a "secret handle", and a "secret injector" to prevent secret misuse. In some embodiments, the secrets storage refers to a storage that holds one or more secret values that can be fetched from one or more locations (e.g., remote computing systems, disk, etc.). By using the secrets storage, a developer can access secret values in a consistent way, regardless of the infrastructural currently being used.

With the secrets framework, when a developer desires to use a raw secret value in application code, the developer requests the raw secret value from the secrets storage. In response to the request, the secrets storage allows the developer to access the secret value by sending a secret handle to the software developer for use by the application code. In some embodiments, the secrets storage uses a library or other code to generate and/or provide the secret handle. Alternatively, secret handles are created prior to the request for its associated value and the previously-created secret handles are provided by the library (or other code) in response to the request.

In some embodiments, the secret handle represents a reference to a single secret value. In some embodiments, the secret handle contains a single secret value. Alternatively, individual secret handles provide access to and contain multiple secret values (e.g., unique combinations of secret values). In some embodiments, the secret handle contains the secret value. In some embodiments, the secret handle is a structure that does not expose the underlying secret value, but allows accessing it through one or more functions that have been previously designated as safe, or security-blessed, functions to use the secret value. Thus, in this regard, the secret handle is passed around instead of passing the raw secret value as text, thereby limiting availability of the secret value to only where it's needed, and only allows access through one or more previously identified functions. In some embodiments, the secrets storage only provides a secret handle for inclusion in an application if the secret value associated with the secret handle is assigned to the application or the application's service. This is beneficial in that secret values accessible by their service can be fetched and common language-specific operations can be performed with secret values without leaking the underlying secret value to the application or to other parts of an infrastructure in which the application resides.

In some embodiments, the framework uses a secret injector to enforce controls that prevent the secret misuse. The secret injector comprises code that is allowed to access the raw secret value. In some embodiments, this secret injector code is the only code that is allowed to access the raw secret value. In some embodiment, the injector code unwraps the secret handle to obtain the raw secret value and then uses it. In some embodiments, the injector code uses the secret value in an operation that the application code wants to perform. In some embodiments, this use occurs immediately after obtaining the raw secret value from the secret handle to help reduce the likelihood of misuse based on the limited time the secret value is available (e.g., in an unsafe state) to perform an operation for the application. Thus, in some embodiments, the secret injector is code that acts a middleman between application code and a raw secret value.

In some embodiments, secret injectors with their associated code are stored in a central location to provide a single point of security. In some embodiments, when application code containing a secret handle is executing, the secret injector code is called. The secret injector code can be called by passing the secret handle to the injector code. Alternatively, the secret injector code is made part of the application code and is executed in response to the application code needing to perform a function involving the secret value in the secret handle. For example, in some embodiments, an HTTP client is set up to always send an "Authorization" header that includes the secret. In such a situation, the injector code is not directly called for every request, and the typical HTTP client API is used with the client knowing to call the injector code on every outgoing request.

Figure 1A:
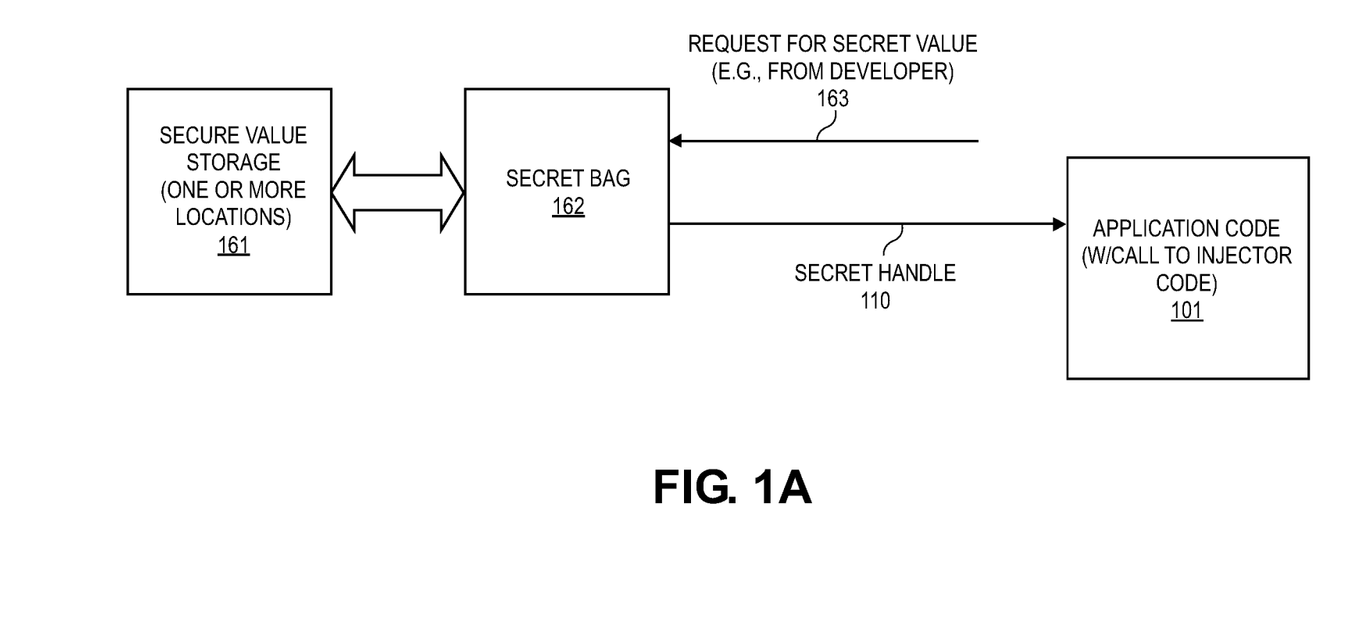
FIG. 1A illustrates one embodiment of a secrets framework.

FIG. 1A illustrates one embodiment of the secrets framework described above. In some embodiments, the components of the secrets framework are implemented, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 1A, secrets bag (storage) 162 provides access to secret values and/or secret handles associated with the secret values, that are stored in storage 161. Storage 161 can be a central storage location or one or more distributed (e.g., remote) storage locations. Secret bag 162 receives a request 163 for a secret value that is to be used in application code. Alternatively, request 163 is a request for using the secret value (as opposed to the secret value itself). In some embodiments, request 163 is sent from a computing device of a developer that wants or needs to use the secret value in the application code of an application service, such as application code 101.

In response to a request, secret bag 162 sends a secret handle 110 that contains the secret value that is associated with request 163. Application code 101 includes secret handle 110 in the application. Injector code 102 can be called to perform an operation with the secret value contained in secret handle 110. Example operations include injecting the secret value into classes/commands that depend on the use of the secret value (e.g., injecting secret values into outgoing requests (e.g., network requests (e.g., HTTP requests) and then redacting or otherwise removing the secret values once a response to the request is received. In some embodiments, when redacting, the secret values are explicitly removed from the response returned when the code knows that it will be returned in a specific location. In some embodiments, in some libraries, the "response" class also includes a fully copy of the "request". In that case, the code prevents accessing the entire copy of the request or just deletes the headers containing injected secrets. Other example operations include replacing an existing string with a reference to the secret handle with the actual secret (e.g., a value a hash of (string, secret handles) is replaced with a string containing the secret values associated with these secret handles) and injecting the secret value into a resource locator (e.g., URL) or a body of a request (e.g., a network request) (e.g., takes a hash that contains a secret handle object as a secret value and replaces the secret handle and then injects the string into the request body; etc.).

Figure 1B:
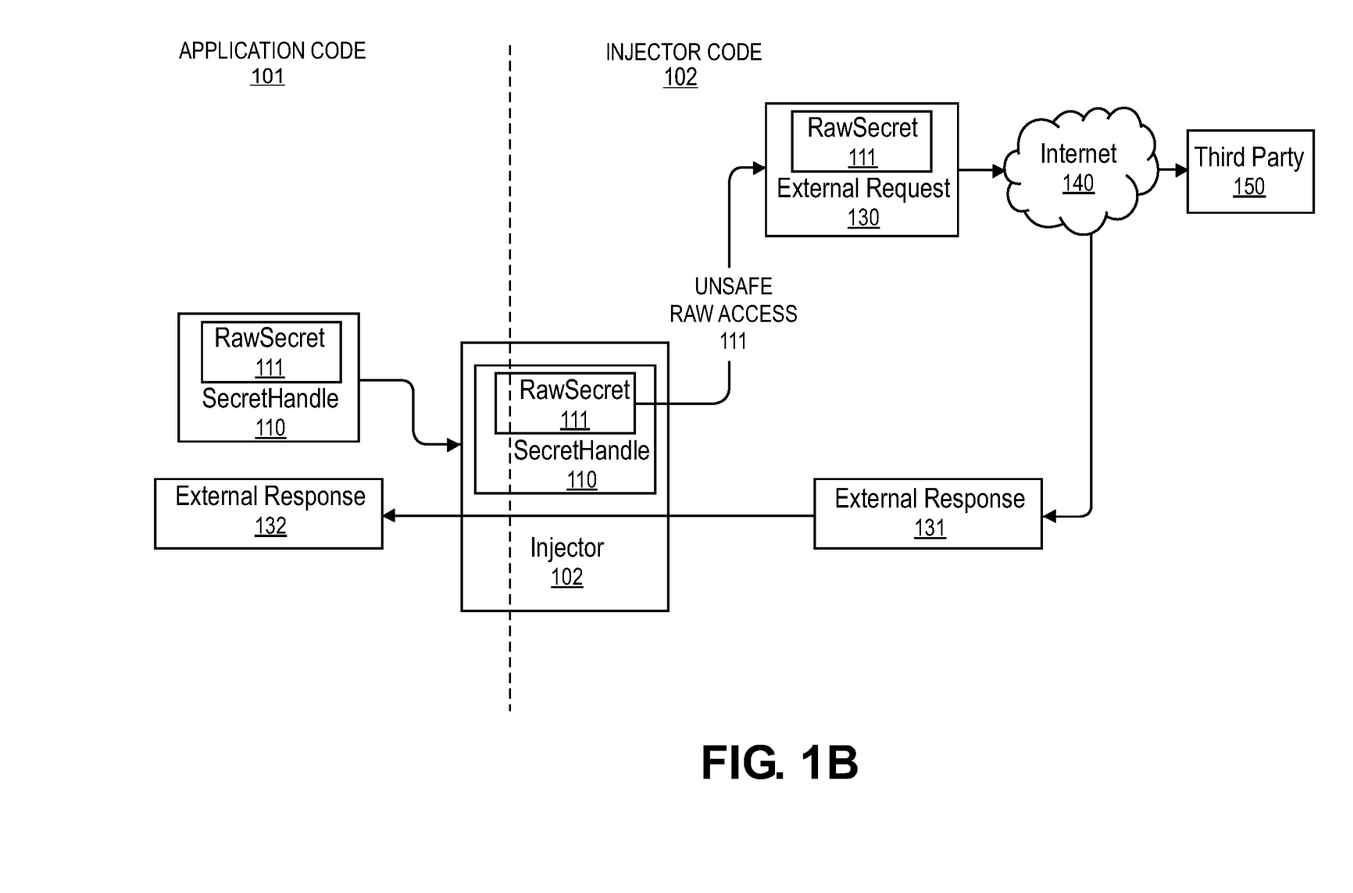
FIG. 1B illustrates data flow diagram of a secrets framework for preventing an application code from accessing a raw secret value that is used in one or more operations of the application code.

FIG. 1B illustrates a data flow diagram of the secrets framework for preventing an application code from accessing a raw secret value used in one or more operations of the application code. As described above, an order to prevent misuse of a secret, the secret's framework limits the application code's access to a raw value of a secret while still permitting the application code to perform operations using the secret value. That is, by limiting application code's access to the raw secret value, the application code can be prevented from causing a whole class of secret misuse, such as, for example, the secret value being logged inadvertently.

Referring to FIG. 1B, application code 101 includes a reference to the raw secret value 111 in the form of secret handle 110. In some embodiments, secret handle 110 includes raw secret 111. When application code 101 is being executed and raw secret value 111 is needed to perform some operation, injector code 102 is executed. Injector code 102 accepts secret handle 110, obtains secret value 111 from secret handle 110, and then uses secret value 111 in the operation on behalf of application code 101. In some embodiments, injector code 102 obtains secret value 111 from secret handle 110 by unwrapping secret handle 110 to obtain raw secret value 111. In some embodiments, application code 101 is designed to insert raw secret value 111 in an external network request, such as external network request 130, that is to be sent over Internet 140 to a third party 150.

To prevent access by application code 101 of raw secret value 111, injector code 102 injects raw secret value 111 into external request 130 itself (as opposed to application code 101) and sends the external request to third party 150 via Internet 140. In some embodiments, injector code 102 inserts raw secret into a header of external request 130. In some embodiments, the raw secret 111 is added to an authorization or other type of header of an external request, such as, for example, an outgoing HTTP or other network request. In some other embodiments, such an external request may be for connecting to a database. Thus, injector code 102 uses raw secret value 111 in an operation by injecting raw secret value 111 into that operation that depends on the use of raw secret value 111.

In some embodiments, injector code 102 also removes raw secret value 111 from a response 131 received, via Internet 140 from third party 150, in response to external request 130. In other words, if external response 131 includes raw secret value 111 as part of the response object, injector code 102 removes raw secret value 111 prior to sending external response 131 onto application code 101. In some embodiments, to perform this redaction, injector code 102 maintains access to the original request object (of external request 130) and removes raw secret value 111 from the response before passing it back to application code 101. In this manner, as shown in FIG. 1B, external response 132 received by application code 101 from injector code 102 does not contain raw secret 111 if it is contained in external response 131.

In some other embodiments, injector code 102 can insert raw secret value 111 into an object, a resource locater (e.g., URL), and/or a string value (e.g., a hash). In the case of a URL, injector code 102 may insert raw secret value 111 in place of the entire URL. In the case of a hash, the hash may include a string with one or more secret handles, and injector code 102 replaces the string hash with one or more raw secret values. In some other embodiments, injector code 102 injects the secrets into a request body.

Figure 2:
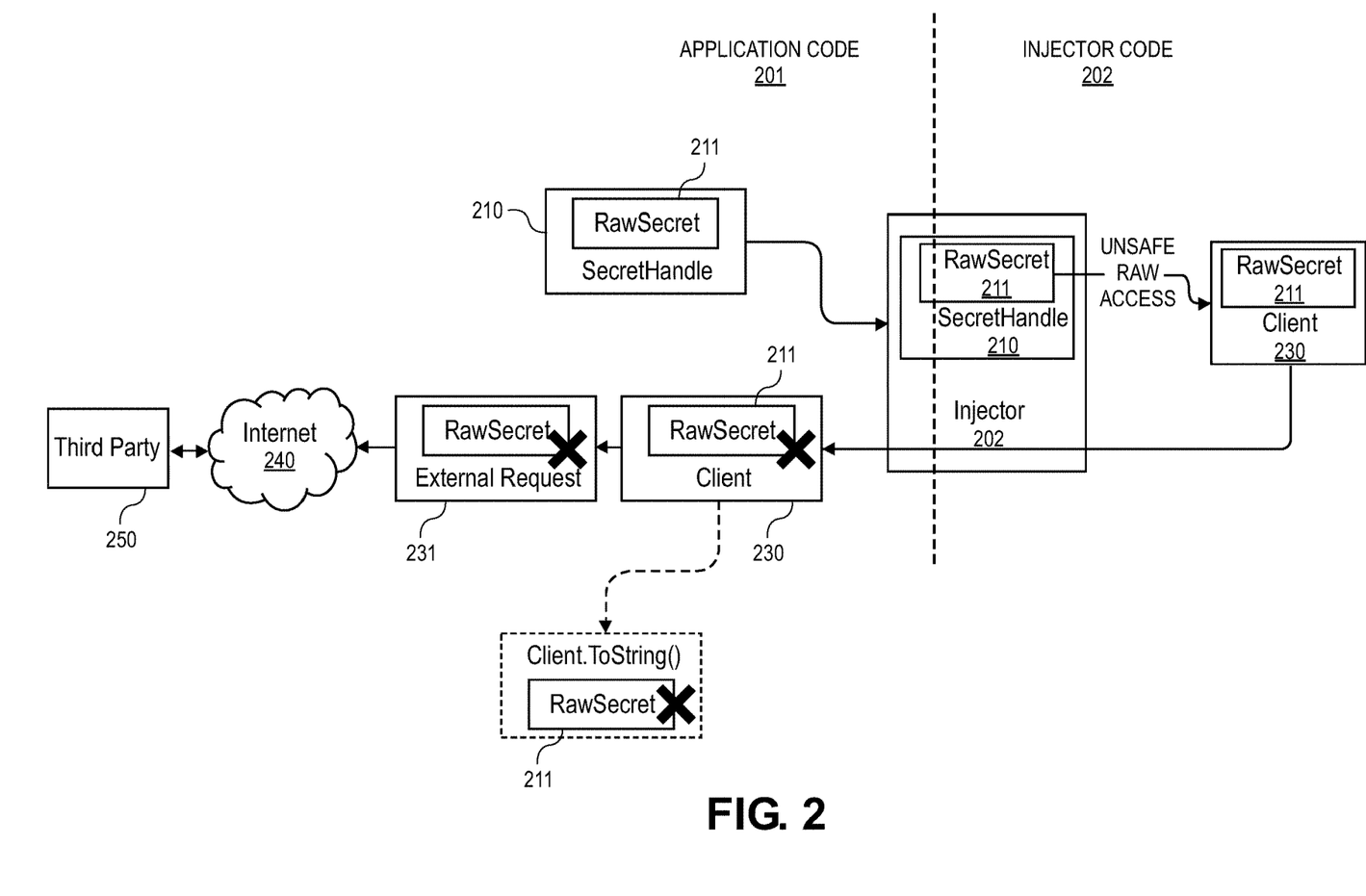
FIG. 2 illustrates an example of returning a client with the raw secret value that may be leaked.

In some embodiments, a secret misuse may occur where when returning a client with the raw secret value. In such a case, injector code may unwrap a raw secret value that is then passed back to the application code in an object that makes accessing the raw secret value trivial. In such a case, by returning a client that has direct access to the raw secret value, it's possible to accidentally expose the raw secret value in client code. Such exposure may result when a string method of printing the object with the raw secret value in plain text via logging. Additionally, an accessor method on the client or via some object can be used to grab the raw secret value. FIG. 2 illustrates an example of returning a client with the raw secret value that may be leaked.

Referring to FIG. 2, application code 201 includes the reference to raw secret 211 in the form of secret handle 210. Injector code 202 executes in response to execution of application code 201 executing and needs to have an operation performed with raw secret value 211. In this case, injector code 202 executes a client 230 that uses raw secret value 211 and passes back client 230 to application code 201 with the raw secret value 211. Thereafter, client 230 may generate an external request 231 with raw secret value 211. External request 231 is a network (e.g. http) request sent to third party 250 via Internet 240. In the example in FIG. 2, client 230 prints the object that contains raw secret value 211 in plain text. This may accidentally expose raw secret value 211 in the client code.

Figure 3:
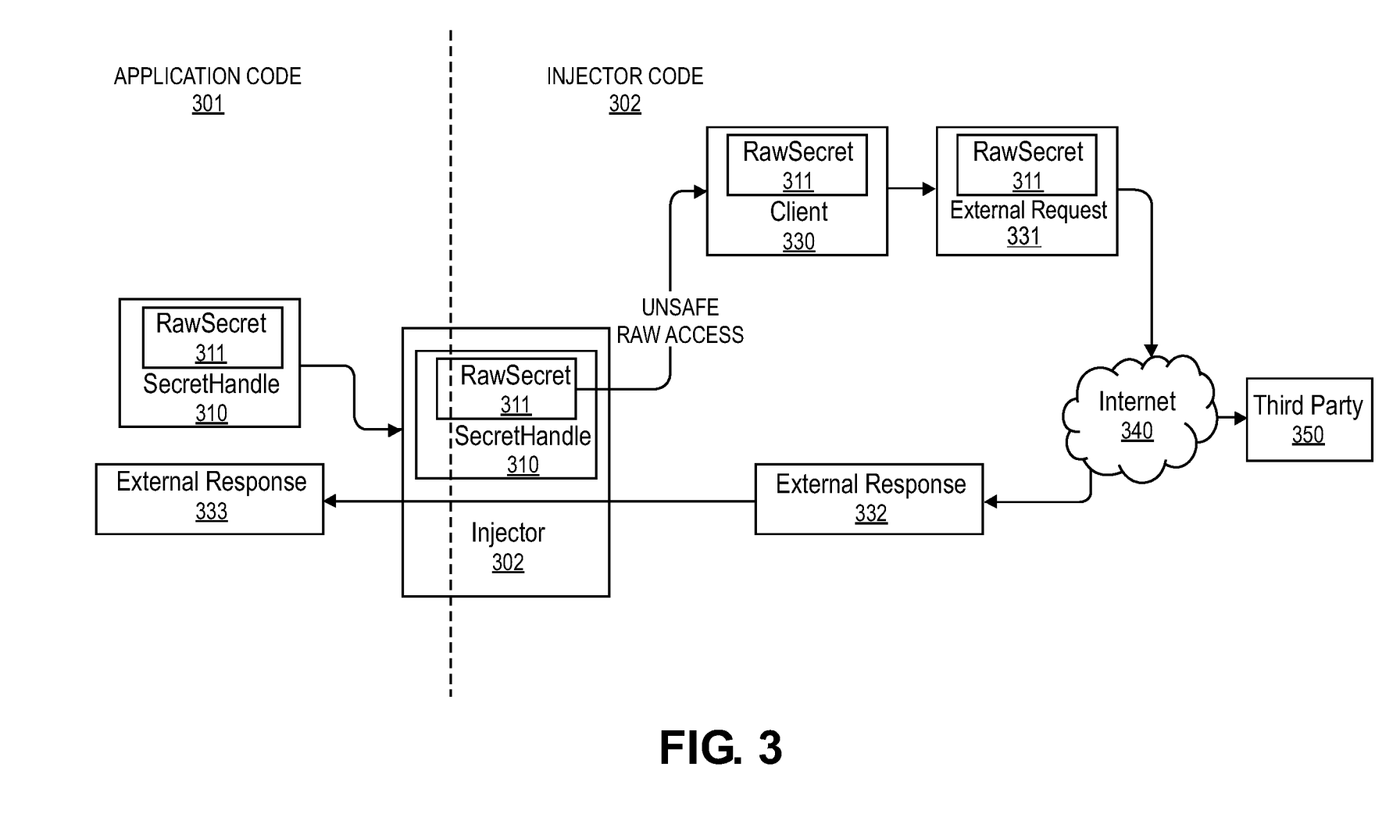
FIG. 3 illustrates and example of an injector code generating a client and an external request.

In order to prevent such an occurrence of secret misuse, the injector code may be configured to create both the client, issue the request to the third party, and return the response on behalf of the application code. This prevents the raw secret value from being accessible to the application code. FIG. 3 illustrates and example of an injector code generating a client and an external request. Referring to FIG. 3, application code 301 includes a reference to raw secret value 311 in the form of secret handle 310. When application code 301 executes and performs an operation with raw secret value 311, injector code 302 is executed and, as part of this execution, creates client 330 that includes raw secret value 311. Client 330 generates external request 331 that includes raw secret value 311 and sends the request to a third party 350 via Internet 340. Subsequently, injector code 302 receives external response 332 and removes, or redacts, raw secret value 311 from external response 332 prior to sending external response 332 back to application code 301 as external response 333. The metadata can be stored with the raw secret value in the secrets storage and/or with the raw secret value in the secret handle. Alternatively, the injector code accesses and evaluates the metadata prior to performing an operation with the raw secret value to ensure the operation complies with any requirements specified in the metadata.

In some embodiments, raw secret values have metadata attached to them, which will allow abstractions built on top of software (e.g., libraries) to verify the correct use of the raw secret. For example, a raw secret value can be tagged as "only for encryption" and its use may be disallowed in a signing operation. In some embodiments, the injector code uses metadata for a raw secret value and controls the use to ensure that the raw secret value is only used in an approved way. For example, the injector code may ensure that only an API key can be sent via a HTTP request, but not an encryption key.

In some embodiments, the secrets framework supports secret rotation, such that the raw secret value can be rotated without needing to perform a code change or deploy of the affected service. In some embodiments, the raw secret values can be changed without changing the application code even after the secret handle has been included in the application code. For example, when an application starts (e.g. every time a code change is deployed), the application loads the secret handles from the secret storage based on the secret name. If the value associated with the secret name in the secret storage is changed, then the application obtains the updated secret value without any change needed to the application code. Thus, the secret storage exists independent of the application code. Furthermore, because the secret storage is independent of the application, then the secret storage system can be changed in its entirety with only a need to change the "framework" code (e.g., by the framework maintainers), without involving the application developers. Since the application interface doesn't change, no "application" code needs to be changed.

In some embodiments, the secrets framework can track usage of a plurality of secret values assigned for use by the application code. The tracking data itself can be sent to any metrics/logging tracking system or infrastructure, which are well known in the art. The observed usage of the secret values when the application code is run is compared against the list of secrets to which the service has access (which is maintained in order to grant a service access to a secret in the first place). This tracking enables changes to be made with respect to the assignment of any secret value to an application. For example, if any secret value is assigned for use by an application but is actually not used, as determined by the tracking, then its assignment to the application code may be revoked. As an example, if a service has access to secrets referred to as "my-password" and "my-private-key", the log would show that the service used "my-private-key" (and only that) in the last 6 months. Upon comparison with the assigned secrets, a determination can be made that there was no use of the secret "my-password", and the system can remove that assignment.

Figure 4:
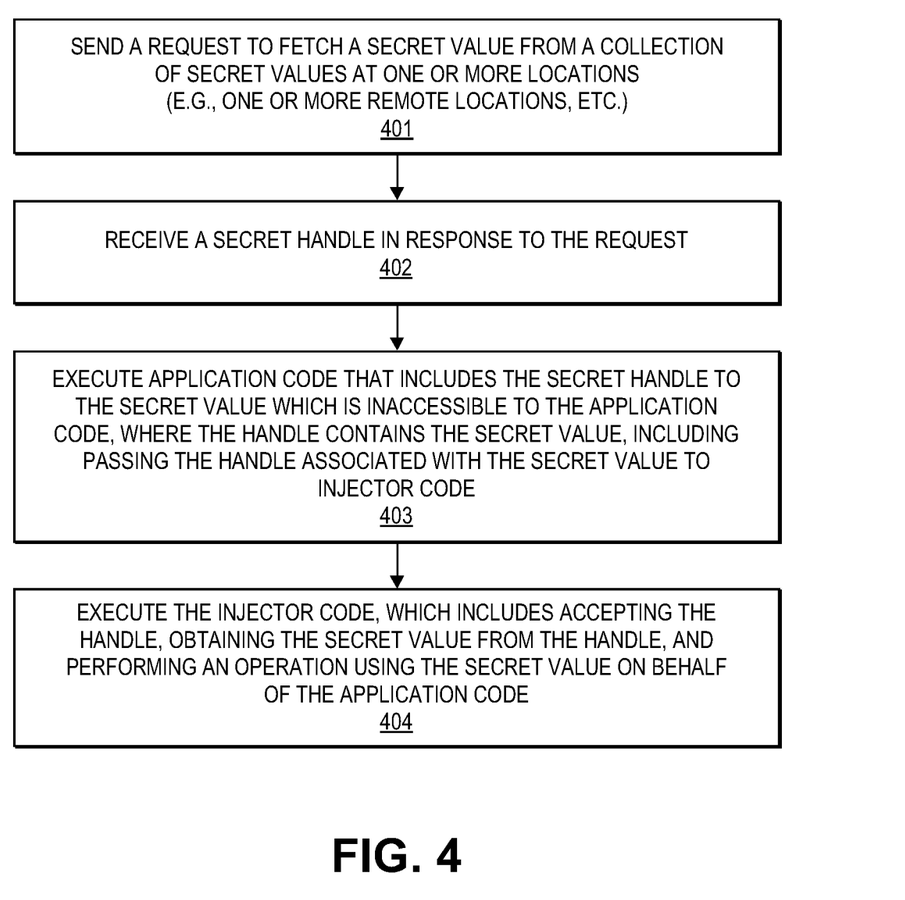
FIG. 4 is a data flow diagram of one embodiment of a process for executing application code while preventing secret misuse.

FIG. 4 is a data flow diagram of one embodiment of a process for executing application code while preventing secret misuse. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 4, the process starts by processing logic sending a request to fetch a secret value from a collection of secret values at one or more locations (e.g., one or more remote locations, disk, etc.) (processing block 401). This can be done as part of creating, or otherwise generating, application code.

In response to the request to obtain the secret value, processing logic receives a secret handle in response to the request (processing block 402). In some embodiments, the secret handle is a reference to the secret value and the secret value is inaccessible to the application code. In some embodiments, the secret handle contains the secret value. In some embodiments, the secret value is assigned to an application service of the application code.

After the application code has been completed, processing logic executes application code that includes the secret handle to the secret value which is inaccessible to the application code, where the handle contains the secret value (processing block 403). In some embodiments, executing application code that includes a reference includes passing the handle associated with the secret value to injector code.

After passing the secret handle to the injector code, processing logic executes the injector code, which includes accepting the handle, obtaining the secret value from the handle, and performing an operation using the secret value on behalf of the application code (processing block 404). In some embodiments, obtaining the secret value from the handle comprises unwrapping the secret handle to get the secret value.

In some embodiments, using the secret value in an operation on behalf of the application code comprises injecting the secret value into the operation that depends on the secret value. In some embodiments, using the secret value in an operation on behalf of the application code comprises injecting the secret value into an outgoing network request and removing the secret value from a response, if contained therein, to the request prior to before the response back to the application code. In some embodiments, injecting the secret value into an outgoing network request comprises adding the secret value to a header of the request. In some embodiments, using the secret value in an operation on behalf of the application code comprises injecting the secret value into an object, a resource locator or a hash.

In some embodiments, the techniques described herein may be used with software that is executed and run on a commerce platform. An example of a commerce platform is described below. In some embodiments, the commerce platform may include payment processing through the use of a payment processor, such as, for example, STRIPE™. After describing an example of a commerce platform, embodiments of a policy engine and transaction processing will be described in more detail.

Figure 5:
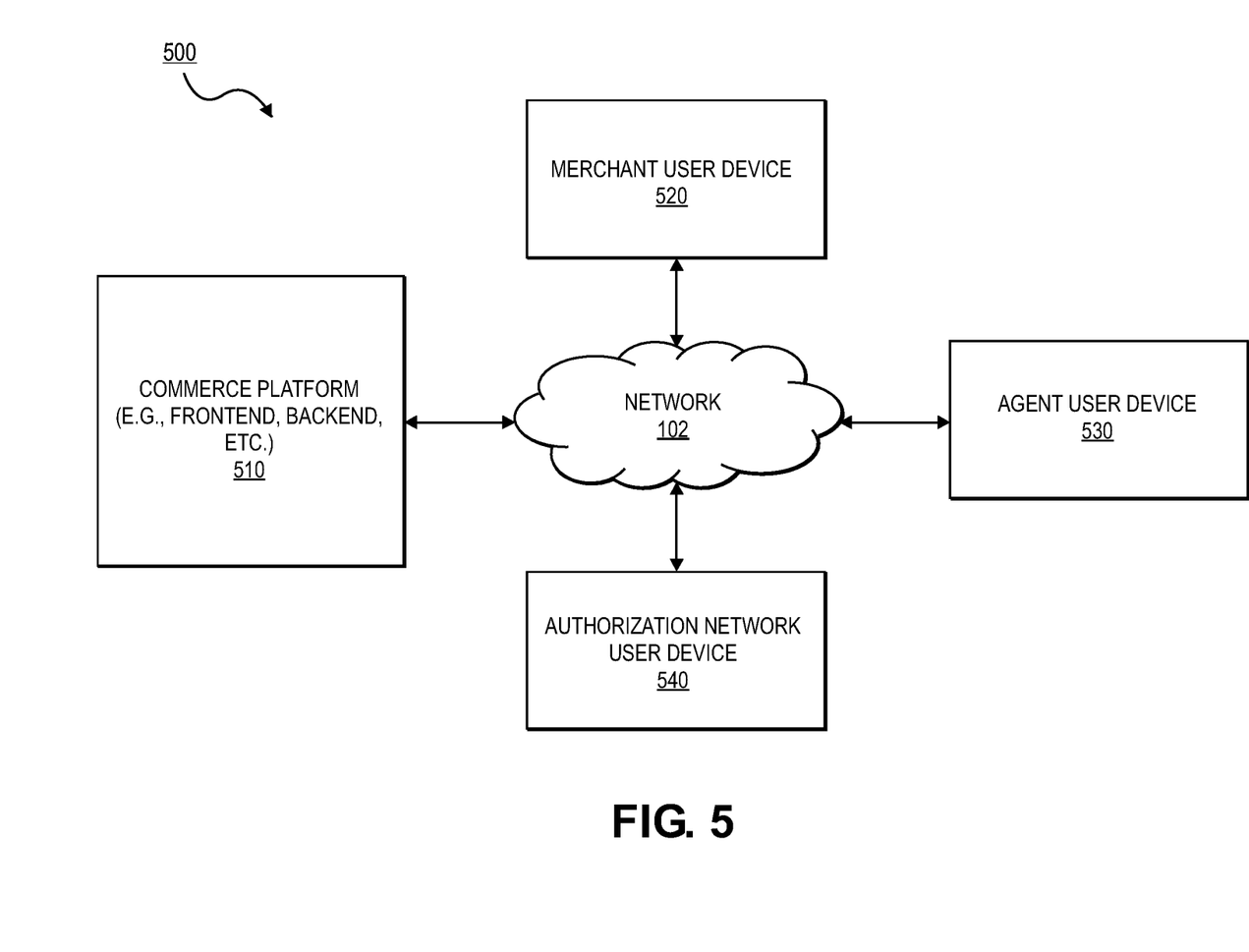
FIG. 5 is a block diagram of an example of a network environment with commerce platform.

FIG. 5 is a block diagram of an example of a system 500 for a commerce platform. In one embodiment, system 500 includes a commerce platform 510, a merchant user device 520, an agent user device 530, and an authorization network user device 540. In one embodiment, user devices (e.g., devices 520, 530, and 540) may be mobile computing devices, such as a smartphone, tablet computer, smartwatch, etc., as well computer systems, such as a desktop computer system, laptop computer system, server computer systems, etc. The commerce platform 510 may also be one or more computing devices, such as one or more server computer systems, desktop computer systems, etc.

The commerce platform 510, merchant user device 520, agent user device 530, and authorization network user device 540 may be coupled to a network 502 and communicate with one another using any of the standard protocols for the exchange of information, including secure communication protocols. In one embodiment, one or more of the commerce platform 510, merchant user device 520, agent user device 530, and authorization network user device 540 may run on one Local Area Network (LAN) and may be incorporated into the same physical or logical system, or different physical or logical systems. Alternatively, the commerce platform 510, merchant user device 520, agent user device 530, and authorization network user device 540 may reside on different LANs, wide area networks, cellular telephone networks, etc. that may be coupled together via the Internet but separated by firewalls, routers, and/or other network devices. In one embodiment, commerce platform 510 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc. In one embodiment, commerce platform 510 provides software service, e.g., financial processing services to one or more of merchant user device 520, agent user device 530, and/or authorization network user device 540, such as managing accounts, running financial transactions, clearing transactions, performing payouts to agents, managing merchant and/or agent accounts, as well as other services typically associated with commerce platforms systems such as, for example, STRIPE™.

In some embodiments, the commerce platform includes a book keeping system or a booking layer that records financial transactions (e.g., payment processing transactions). In some embodiments, these transactions include money movements between accounts (e.g., between account balances) or involve at least one account (e.g., a payout, a payment, etc.) of or controlled by a payment processor. In some embodiments, the account balances may be those of customers (e.g., merchants, users, banks, etc.) of the payment processing system, and transactions are designated or otherwise addressed to the book keeping system. In some embodiments, these transactions are sent as network communications or messages to the book keeping system over one or more network connections.

Figure 6:
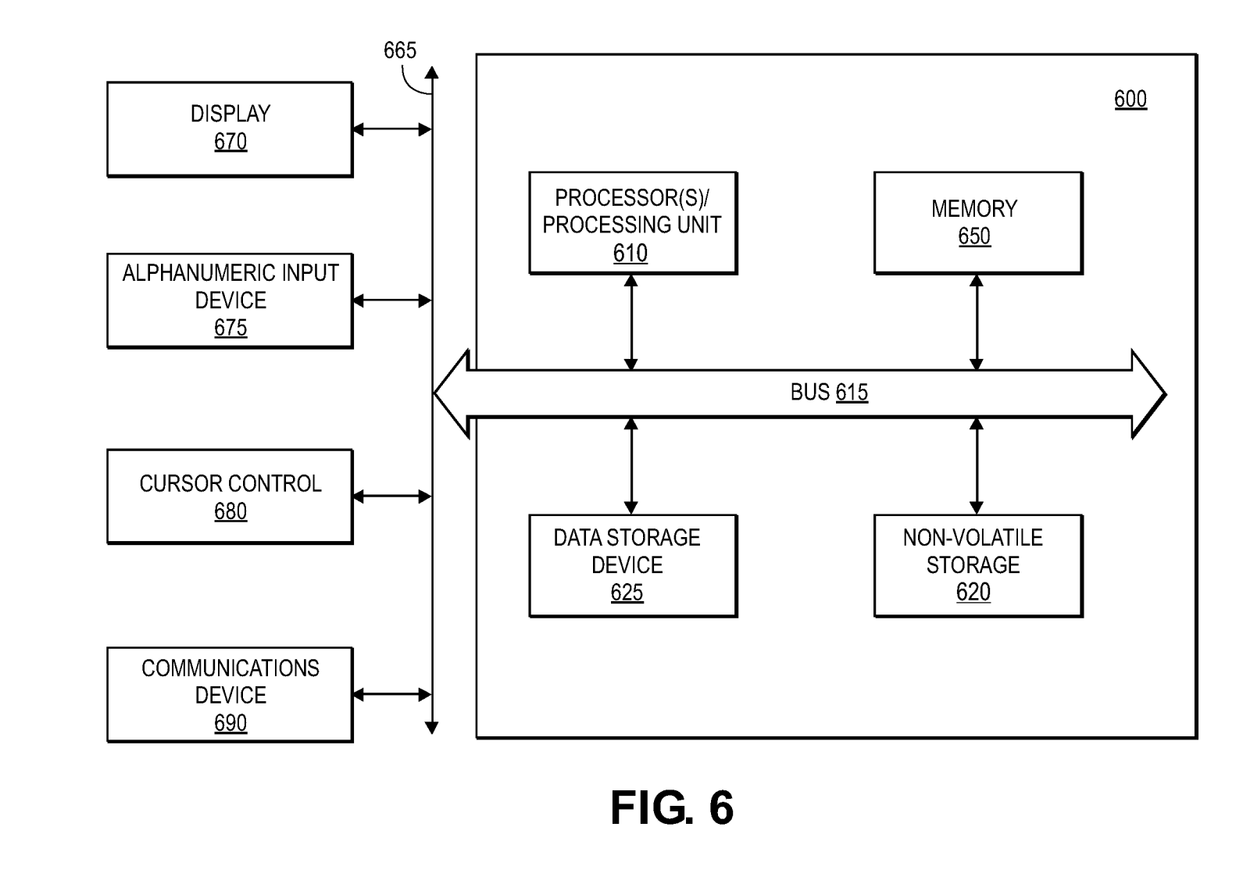
FIG. 6 is a block diagram of one embodiment of a computer system that may be used to support the systems and operations discussed herein.

FIG. 6 is one embodiment of a computer system that may be used to support the systems and operations discussed herein. It will be apparent to those of ordinary skill in the art, however, that other alternative systems of various system architectures may also be used.

The data processing system illustrated in FIG. 6 includes a bus or other internal communication means 615 for communicating information, and a processor(s) 610 coupled to the bus 615 for processing information. The system further comprises a random-access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor(s) 610. The system also comprises a non-volatile storage 620, such as a read only memory (ROM) and/or static storage device, coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

In some embodiments, processor(s) 610 executes instructions to perform any of the operations described above including, but not limited to, executing application code that includes a reference to a secret value inaccessible to the application code, the reference being in the form of a handle that contains the secret value, including passing the handle to injector code; and executing the injector code, including accepting the handle, obtaining the secret value from the handle, and using the secret value in an operation on behalf of the application code. In some embodiments, processor(s) 610 executes instructions to obtain the secret value from the handle by unwrapping the secret handle to get the secret value and injecting the secret value into the operation that depends on the secret value. In some embodiments, processor(s) 610 also executes instructions to use the secret value in an operation on behalf of the application code comprises injecting the secret value into an outgoing network request, remove the secret value from a response to the request prior to before the response back to the application code, inject the secret value into an outgoing network request comprises adding the secret value to a header of the request, use the secret value in an operation on behalf of the application code comprises injecting the secret value into an object, a resource locator or a hash. In some embodiments, processor(s) 610 also executes instructions to send a request to fetch the secret value from a collection of secret values at one or more locations, and receive the secret handle in response to the request, where the secret value is assigned to an application service of the application code. In some embodiments, processor(s) 610 also executes instructions to change the secret value after the handle has been included in the application code without performing a code change in the application code, and/or track usage of a plurality of secret values assigned for use by the application code and change assignment of any secret value of the plurality of secret values determined unused by the application code to prevent access of said any secret value by the application code.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or non-volatile storage 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 665, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need to be present for the device to function.

There are a number of example embodiments described herein.

Example 1 is a method to prevent secret misuse, where the method comprises: executing, by a computing system, application code that includes a reference to a secret value inaccessible to the application code, the reference being in the form of a handle that contains the secret value, including passing the handle to injector code; and executing the injector code, including accepting the handle; obtaining the secret value from the handle; and using the secret value in an operation on behalf of the application code.

Example 2 is the method of example 1 that may optionally include that obtaining the secret value from the handle comprises unwrapping the secret handle to get the secret value.

Example 3 is the method of example 1 that may optionally include that using the secret value in an operation on behalf of the application code comprises injecting the secret value into the operation that depends on the secret value.

Example 4 is the method of example 1 that may optionally include that using the secret value in an operation on behalf of the application code comprises injecting the secret value into an outgoing network request.

Example 5 is the method of example 4 that may optionally include removing the secret value from a response to the request prior to before the response back to the application code.

Example 6 is the method of example 1 that may optionally include that injecting the secret value into an outgoing network request comprises adding the secret value to a header of the request.

Example 7 is the method of example 1 that may optionally include that using the secret value in an operation on behalf of the application code comprises injecting the secret value into an object, a resource locator or a hash.

Example 8 is the method of example 1 that may optionally include sending a request to fetch the secret value from a collection of secret values at one or more locations; and receiving the secret handle in response to the request.

Example 9 is the method of example 8 that may optionally include that the secret value is assigned to an application service of the application code.

Example 10 is the method of example 1 that may optionally include changing the secret value after the handle has been included in the application code without performing a code change in the application code.

Example 11 is the method of example 1 that may optionally include tracking usage of a plurality of secret values assigned for use by the application code; and changing assignment of any secret value of the plurality of secret values determined unused by the application code to prevent access of said any secret value by the application code.

Example 12 is a system comprising: a memory to store instructions; and one or more processors coupled to the memory to execute the stored instructions to run a policy engine to: execute application code that includes a reference to a secret value inaccessible to the application code, the reference being in the form of a handle that contains the secret value, including passing the handle to injector code, and execute the injector code, including accepting the handle; obtaining the secret value from the handle; and using the secret value in an operation on behalf of the application code.

Example 13 is the system of example 12 that may optionally include that obtaining the secret value from the handle comprises unwrapping the secret handle to get the secret value.

Example 14 is the system of example 12 that may optionally include that using the secret value in an operation on behalf of the application code comprises injecting the secret value into the operation that depends on the secret value.

Example 15 is the system of example 12 that may optionally include that using the secret value in an operation on behalf of the application code comprises injecting the secret value into an outgoing network request.

Example 16 is the system of example 12 that may optionally include that the one or more processors are configured to remove the secret value from a response to the request prior to before the response back to the application code.

Example 17 is one or more non-transitory computer readable storage media having instructions stored thereupon which, when executed by a system having at least a processor and a memory therein, cause the system to perform a method to prevent secret misuse, where the method comprises: executing application code that includes a reference to a secret value inaccessible to the application code, the reference being in the form of a handle that contains the secret value, including passing the handle to injector code; and executing the injector code, including accepting the handle; obtaining the secret value from the handle; and using the secret value in an operation on behalf of the application code.

Example 18 is the one or more non-transitory computer readable storage media of example 17 that may optionally include that obtaining the secret value from the handle comprises unwrapping the secret handle to get the secret value.

Example 19 is the one or more non-transitory computer readable storage media of example 17 that may optionally include that using the secret value in an operation on behalf of the application code comprises injecting the secret value into the operation that depends on the secret value.

Example 20 is the one or more non-transitory computer readable storage media of example 17 that may optionally include that using the secret value in an operation on behalf of the application code comprises injecting the secret value into an outgoing network request, and wherein the method further comprises removing the secret value from a response to the request prior to before the response back to the application code.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the disclosure.

We claim:

1. A method to prevent secret misuse, the method comprising:
    sending, by a computing system, a request to fetch a secret value from a collection of secret values at one or more locations;
    receiving, by the computing system in response to the request, a handle that contains the secret value;
    executing, by the computing system, application code that includes a reference to the secret value inaccessible to the application code, wherein the reference is the handle that contains the secret value, wherein the application code performs an operation using the secret value referenced by the handle, and wherein executing the application code to perform the operation comprises passing the handle to injector code; and
    executing the injector code, including
    accepting the handle;
    obtaining the secret value from the handle without exposing the secret value to the application code;
    using the secret value in the operation on behalf of the application code by executing a client created by the injector code, the client using the secret value to perform the operation;
    redacting the secret value from a response indicating performance of the operation prior to providing the response to the application code; and
    passing the response to the application code, wherein the response omits the secret value to prevent exposure of the secret value to the application code.

2. The method of claim 1 wherein obtaining the secret value from the handle comprises unwrapping the handle to get the secret value.

3. The method of claim 1 wherein using the secret value in the operation on behalf of the application code comprises injecting the secret value into the operation that depends on the secret value.

4. The method of claim 1 wherein using the secret value in the operation on behalf of the application code comprises injecting the secret value into an outgoing network request.

5. The method of claim 4 wherein injecting the secret value into the outgoing network request comprises adding the secret value to a header of the request.

6. The method of claim 1 wherein using the secret value in the operation on behalf of the application code comprises injecting the secret value into an object, a resource locator or a hash.

7. The method of claim 1 wherein the secret value is assigned to an application service of the application code.

8. The method of claim 1 further comprising changing the secret value after the handle has been included in the application code without performing a code change in the application code.

9. The method of claim 1 further comprising:
    tracking usage of a plurality of secret values assigned for use by the application code; and
    changing assignment of any secret value of the plurality of secret values determined unused by the application code to prevent access of said any secret value by the application code.

10. A system comprising:
    a memory to store instructions; and
    one or more processors coupled to the memory to execute the stored instructions to run a policy engine to:
        send a request to fetch a secret value from a collection of secret values at one or more locations;
        receive, in response to the request, a handle that contains the secret value;
        execute application code that includes a reference to the secret value inaccessible to the application code, wherein the reference is the handle that contains the secret value, wherein the application code performs an operation using the secret value referenced by the handle, and wherein executing the application code to perform the operation comprises passing the handle to injector code, and
    execute the injector code, including
    accepting the handle;
    obtaining the secret value from the handle without exposing the secret value to the application code;
    using the secret value in the operation on behalf of the application code by executing a client created by the injector code, the client using the secret value to perform the operation;
    redacting the secret value from a response indicating performance of the operation prior to providing the response to the application code; and
    passing the response to the application code, wherein the response omits the secret value to prevent exposure of the secret value to the application code.

11. The system of claim 10 wherein obtaining the secret value from the handle comprises unwrapping the secret handle to get the secret value.

12. The system of claim 10 wherein using the secret value in the operation on behalf of the application code comprises injecting the secret value into the operation that depends on the secret value.

13. The system of claim 10 wherein using the secret value in the operation on behalf of the application code comprises injecting the secret value into an outgoing network request.

14. One or more non-transitory computer readable storage media having instructions stored thereupon which, when executed by a system having at least a processor and a memory therein, cause the system to perform a method to prevent secret misuse, the method comprising:
    sending a request to fetch a secret value from a collection of secret values at one or more locations;
    receiving, in response to the request, a handle that contains the secret value;

executing application code that includes the reference to the secret value inaccessible to the application code, wherein the reference is the handle that contains the secret value, wherein the application code performs an operation using the secret value referenced by the handle, and wherein executing the application code to perform the operation comprises passing the handle to injector code; and executing the injector code, including accepting the handle;

obtaining the secret value from the handle without exposing the secret value to the application code;

using the secret value in the operation on behalf of the application code by executing a client created by the injector code, the client using the secret value to perform the operation;

redacting the secret value from a response indicating performance of the operation prior to providing the response to the application code; and passing the response to the application code, wherein the response omits the secret value to prevent exposure of the secret value to the application code.

15. The one or more non-transitory computer readable storage media of claim 14 wherein obtaining the secret value from the handle comprises unwrapping the handle to get the secret value.

16. The one or more non-transitory computer readable storage media of claim 14 wherein using the secret value in the operation on behalf of the application code comprises injecting the secret value into the operation that depends on the secret value.

17. The one or more non-transitory computer readable storage media of claim 14 wherein using the secret value in the operation on behalf of the application code comprises injecting the secret value into an outgoing network request.

* * * * *